(12) United States Patent
Codilian et al.

(10) Patent No.: US 6,894,861 B1
(45) Date of Patent: May 17, 2005

(54) METHOD FOR REDUCING WRITTEN-IN RUNOUT DURING SERVO TRACK WRITING OF A DISK DRIVE

(75) Inventors: Raffi Codilian, Irvine, CA (US); Joseph M. Viglione, Laguna Hills, CA (US)

(73) Assignee: Western Digital Technologies, Inc., Lake Forest, CA (US)

(*) Notice: Subject to any disclaimer, the term of this patent is extended or adjusted under 35 U.S.C. 154(b) by 377 days.

(21) Appl. No.: 09/967,828

(22) Filed: Sep. 28, 2001

(51) Int. Cl.[7] ............................................... G11B 21/02
(52) U.S. Cl. ...................................... 360/75; 360/73.03
(58) Field of Search .............................. 360/77.04, 75, 360/71, 73.03, 73.05, 69, 77.11, 31, 73.01

(56) References Cited

U.S. PATENT DOCUMENTS

| | | | | |
|---|---|---|---|---|
| 4,514,771 A | * | 4/1985 | Stark et al. ............. | 360/73.03 |
| 5,448,429 A | * | 9/1995 | Cribbs et al. ............ | 360/75 |
| 5,506,735 A | * | 4/1996 | Okazaki .................. | 360/75 |
| 6,310,740 B1 | * | 10/2001 | Dunbar et al. ............ | 360/46 |
| 6,587,293 B1 | * | 7/2003 | Ding et al. ............... | 360/51 |
| 6,741,414 B1 | * | 5/2004 | Boyd et al. ............... | 360/73.03 |

\* cited by examiner

*Primary Examiner*—Sinh Tran
*Assistant Examiner*—Daniell L. Negrón
(74) *Attorney, Agent, or Firm*—Milad G. Shara, Esq.; Knobbe, Martens, Olson & Bear

(57) ABSTRACT

A method for reducing written-in runout of a disk drive writes a plurality of servo tracks onto a magnetic-storage portion of a disk that comprises a first radial band proximate the outer circumference of the disk, and a second radial band between the first radial band and the inner circumference of the disk. A first plurality of servo tracks is written to the storage medium in the first radial band at a first servo-writing spin rate. A second plurality of servo tracks is written to the storage medium in the second radial band at a second servo-writing spin rate that is different from the first servo-writing spin rate.

14 Claims, 5 Drawing Sheets

METHOD FOR REDUCING WRITTEN-IN RUNOUT DURING SERVO TRACK WRITING OF A DISK DRIVE

BACKGROUND OF THE INVENTION

1. Field of the Invention

The present invention relates to an apparatus and method for writing servo tracks to a disk drive to reduce written-in runout.

2. Description of the Related Art

Disk drives generally can permanently store information in the form of magnetic transitions written onto and read from one or more rigid disks. These transitions are written by a recording head in generally concentric tracks on the disks. A servo system is provided in the disk drive that includes a plurality of servo sectors on the disks to enable the head to access, or to seek, a particular track. The servo system also enables the head to remain on the track, or to track-follow. Servo performance can degrade if the servo tracks written to the disk are non-circular, a phenomenon known as written-in runout.

One cause of written-in runout is disk flutter, a motion of the disk in a direction that is generally perpendicular to the disk surface, which is induced in the disk during the disk's rotation. Windage tends to be a prime cause of disk flutter, and varies proportionally to spindle speed. The flutter causes the surface of the disk to move axially and radially beneath the writing element of the recording head, which causes the writing element to write a track having a non-circular circumference around the disk. The non-circularity of a servo track is referred to as written-in runout of the servo track. When a servo track is read during track-following, the servo controller must position the reading element of the recording head so that the reading element follows the non-circular circumference of the servo track.

Typically, during a servo writing process, the spindle motor is rotated at a constant spindle motor speed to write all the servo tracks on the surface of the media. The particular spindle speed can be derived by running experiments prior to production to perform a series of measurements of disk runout at various speeds. The data from the measurements can then be summarized in what is known as a Campbell diagram, which reveals suitable spindle speeds for servo track writing. Generally, a single speed is chosen that is the highest spindle speed that does not generate greater than the maximum acceptable disk runout. The highest spindle speed is chosen because lower servo writing spin rates increase process time, which either limits disk drive production volume or forces disk drive manufacturers to purchase and maintain too many expensive servo writers.

As is well known, the density at which data bits are written on the disks is ever-increasing. The increased density requires the servo tracks to be written with less and less runout. At the same time, disk drive manufacturers are cutting costs and cannot increase the number of servo writers in order to write all servo tracks at lower speeds.

SUMMARY OF THE INVENTION

There is, therefore, a need for a method and apparatus to write servo tracks onto disk drives in a manner that maximizes throughput without compromising disk drive performance due to excessive written-in runout error.

A first aspect of the present invention is a method for reducing written-in runout of a disk drive that comprises a recording head, a rotary actuator, a spindle motor, and a storage medium coupled to the spindle motor. The storage medium comprises an inner circumference, an outer circumference, and a magnetic-storage portion between the inner circumference and the outer circumference. The magnetic-storage portion comprises a first radial band proximate the outer circumference and a second radial band between the first radial band and the inner circumference. A first plurality of servo tracks are written to the storage medium in the first radial band at a first servo-writing spin rate. A second plurality of servo tracks are written to the storage medium in the second radial band at a second servo-writing spin rate.

Another aspect of the present invention is a disk drive that comprises a rotary actuator, a recording head mounted on the rotary actuator, and a storage medium. The storage medium comprises an inner circumference, an outer circumference, and a magnetic-storage portion between the inner circumference and the outer circumference. The magnetic-storage portion comprises a first radial band proximate the outer circumference that comprises a first plurality of generally concentric servo tracks. The magnetic-storage portion also comprises a second radial band between the first radial band and the inner circumference. The second radial band comprises a second plurality of generally concentric servo tracks. The disk drive also comprises a spindle motor that rotates the storage medium at a first servo-writing spin rate and at a second servo-writing spin rate. The second servo-writing spin rate is different from the first servo-writing spin rate. The spindle motor rotates the storage medium at the first servo-writing spin rate while the recording head writes the first plurality of generally concentric servo tracks. The spindle motor rotates the storage medium at the second servo-writing spin rate while the recording head writes the second plurality of servo tracks.

Another aspect of the present invention is a disk drive that comprises a rotary actuator; a recording head mounted on the rotary actuator, a spindle motor, and a storage medium mounted on the spindle motor. The storage medium comprises an inner circumference, an outer circumference, and a magnetic-storage portion between the inner circumference and the outer circumference. The magnetic-storage portion comprises a first radial band proximate the outer circumference that comprises a first plurality of generally concentric servo tracks. The magnetic storage portion comprises a second radial band between the first radial band and the inner circumference. The second radial band comprises a second plurality of generally concentric servo tracks. The magnetic storage portion is written by a process that comprises writing a first plurality of servo tracks to the storage medium in the first radial band at a first servo-writing spin rate. The process also comprises writing a second plurality of servo tracks to the storage medium in the second radial band at a second servo-writing spin rate.

Another aspect of the present invention is a servo track writer for writing servo tracks on a storage medium of a head-disk assembly. The head-disk assembly comprises a recording head mounted on an actuator, and the storage medium. The storage medium comprises an inner circumference, an outer circumference and a magnetic-storage portion between the inner circumference and the outer circumference. The magnetic-storage portion comprises a first radial band proximate the outer circumference, and a second radial band between the first radial band and the inner circumference. The servo track writer comprises a push pin and a head positioner circuit that comprises a positioning mechanism. The positioning mechanism actuates the push pin in a step-wise fashion to impart a step-wise movement to the actuator. The servo track writer also comprises a controller that directs the recording head to write the servo tracks to the storage medium. The controller also applies a first current to the spindle motor to rotate the spindle motor at a first servo-writing spin rate when the recording head is over the first radial band. The controller also applies a second current to the spindle motor to rotate the spindle motor at a second servo-writing spin rate when the recording head is over the second radial band.

Another aspect of the present invention comprises a servo track writer and disk drive combination. The disk drive comprises a recording head, a rotary actuator, a spindle motor, and a storage medium coupled to the spindle motor. The storage medium comprises an inner circumference, an outer circumference, and a magnetic-storage portion between the inner circumference and the outer circumference. The magnetic-storage portion comprises a first radial band proximate the outer circumference and a second radial band between the first radial band and the inner circumference. The servo track writer comprises a push pin that engages the rotary actuator in the disk drive and a head positioner circuit. The head positioner circuit comprises a positioning mechanism that actuates the push pin in a step-wise fashion to impart a step-wise movement to the actuator, and a controller. The controller directs the head to write the servo tracks. The controller also applies a first current to the spindle motor to rotate the spindle motor at a first servo-writing spin rate when the recording head is over the first radial band. The controller applies a second current to the spindle motor to rotate the spindle motor at a second servo-writing spin rate when the recording head is over the second radial band.

BRIEF DESCRIPTION OF THE DRAWINGS

The accompanying drawings are included to provide a further understanding of the present invention and are incorporated in and constitute a part of this specification. The drawings illustrate embodiments of the present invention and together with the description serve to explain the principles of the invention.

DETAILED DESCRIPTION OF THE PREFERRED EMBODIMENT

Figure 1:
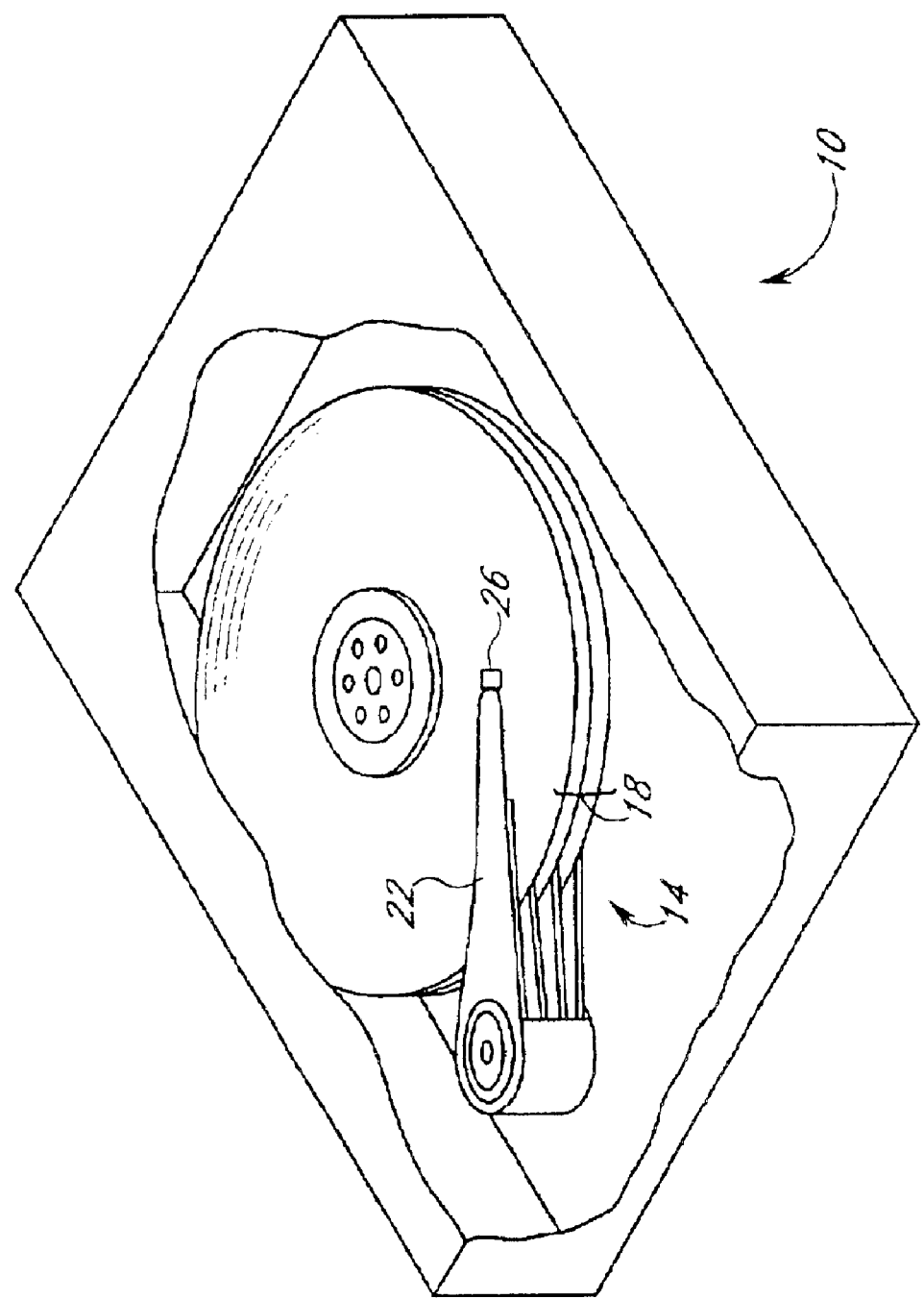
FIG. 1 is a pictorial representation of a disk drive comprising a HDA.
Figure 2:
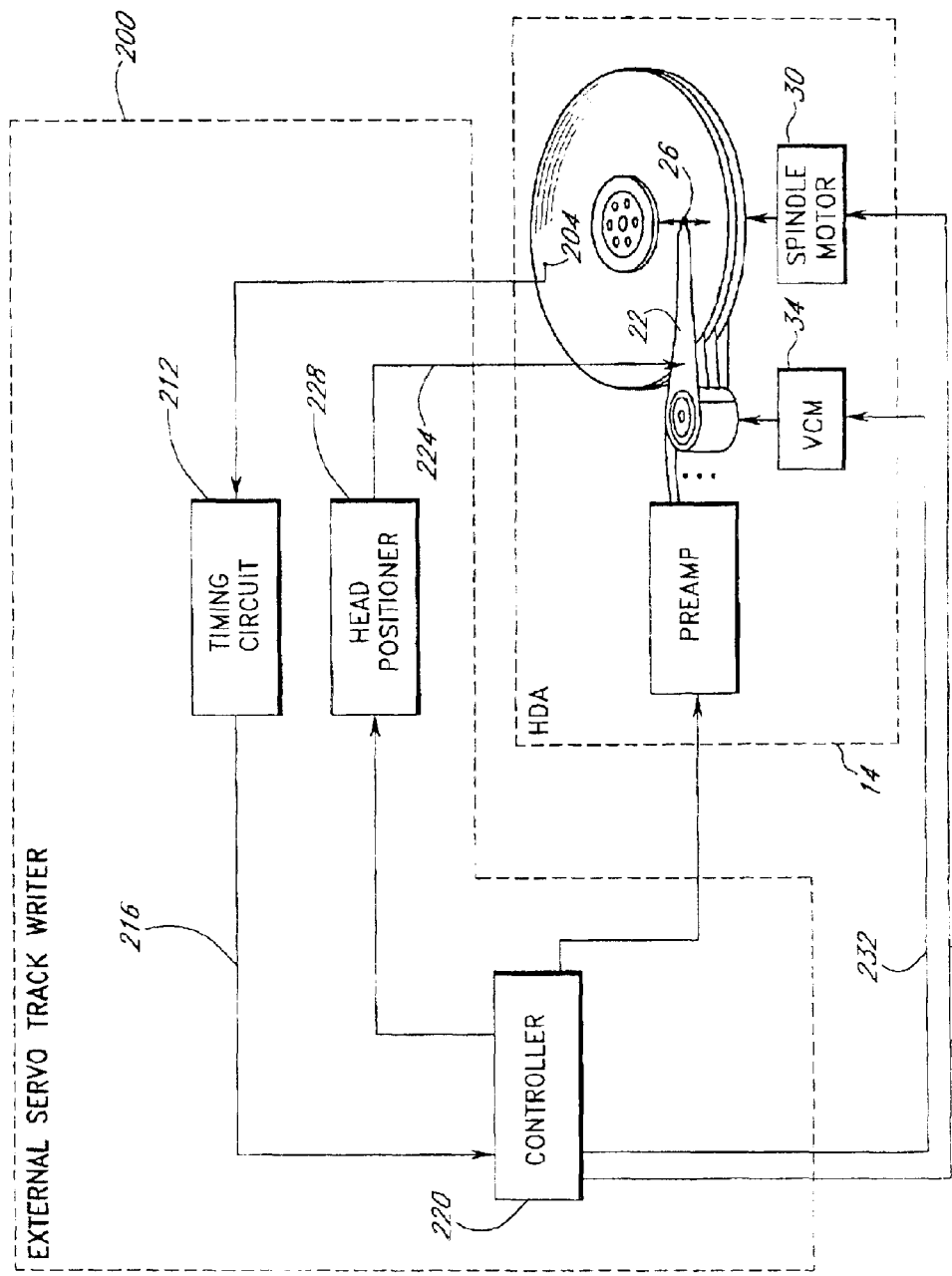
FIG. 2 pictorially illustrates the HDA of the disk drive of FIG. 1 inserted during manufacturing into an external servo track writer that writes servo tracks according to the method described herein.

FIG. 1 shows a disk drive 10 comprising a head-disk assembly (HDA) 14 that includes an array of magnetic disks (or storage media) 18, a rotary actuator 22, a plurality of recording heads 26 attached to the actuator arms, and a spindle motor 30 (see FIG. 2). The disk drive 10 also includes a voice-coil motor (VCM) 34 that positions the actuator 22 and heads 26 (see FIG. 2).

The recording surfaces of the magnetic disks 18 comprise a plurality of concentric, radially spaced tracks partitioned into a number of data sectors. The recording surfaces comprise a plurality of embedded servo wedges, or servo sectors, which facilitate positioning the heads 26 over a desired data sector within a particular track on the disks 18. The operation of the disk drive and servo system is well known in the art and will not be described herein.

The servo sectors are written to the recording surfaces as part of the manufacturing process to enable the seek and tracking operations necessary to write and read the data sectors. A common mechanism for writing the servo sectors to the recording surfaces is an external servo track writer. In another variation, a significant cost reduction can be achieved by a "self-servowriting" method, which can use circuitry in the disk drive for writing the servo sectors.

During the manufacture of the disk drive 10 shown in FIG. 1, an external servo track writer can be employed to simultaneously write the servo sectors to all of the recording surfaces in parallel (i.e., bank writing). FIG. 2 shows the HDA 14 of the disk drive of FIG. 1 inserted into an external servo track writer 200. The servo track writer 200 uses the electronics and the heads within the HDA, but uses separate control circuitry and servo mechanics for radially positioning the heads. For example, a laser interferometer is advantageously used to provide precise head positioning. The external servo track writer 200 comprises a "clock head" 204 positioned over one of the recording surfaces for reading a magnetic clock reference pattern in a clock track preferably located proximate the outer diameter of the recording surface of one of the disks 18. When bank writing the servo sectors, the magnetic clock reference pattern is read by the clock head 204 and processed by a timing circuit 212, which generates a timing clock 216 applied to a controller 220. The controller 220 processes the timing clock 216 to derive the precise circumferential location of the heads 26 with respect to the tracks on the disks 18 so that the servo sectors are written at the same circumferential location for all tracks.

The external servo track writer 200 further comprises a push pin 224 which is inserted into the HDA 14 and into a hole in the actuator arm 22. A head positioner circuit 228, comprises a laser interferometer or other suitable positioning mechanism. The head positioner circuit 228 actuates the push pin 224 to precisely position the heads 26 radially over the disks 18 while writing the servo sectors (servo data and servo bursts). The controller 220 applies a bias current to the coil of the VCM 34 over a conductor 232 in order to bias the actuator arm 22 against the push pin 224 to facilitate precise positioning of the heads 26. The controller 220 also applies a current to the coil of the spindle motor 30 over a line 236 in order to spin up the disks 18 and then rotate the disks 18 at a substantially constant angular velocity. One skilled in the art will appreciate that the spindle motor 30 is advantageously implemented by a commutated DC motor (i.e., a brushless DC motor). Thus, the line 236 comprises a plurality of lines to the field windings of the motor, and a sequence of voltages are applied to the field windings to rotate the motor.

Figure 3:
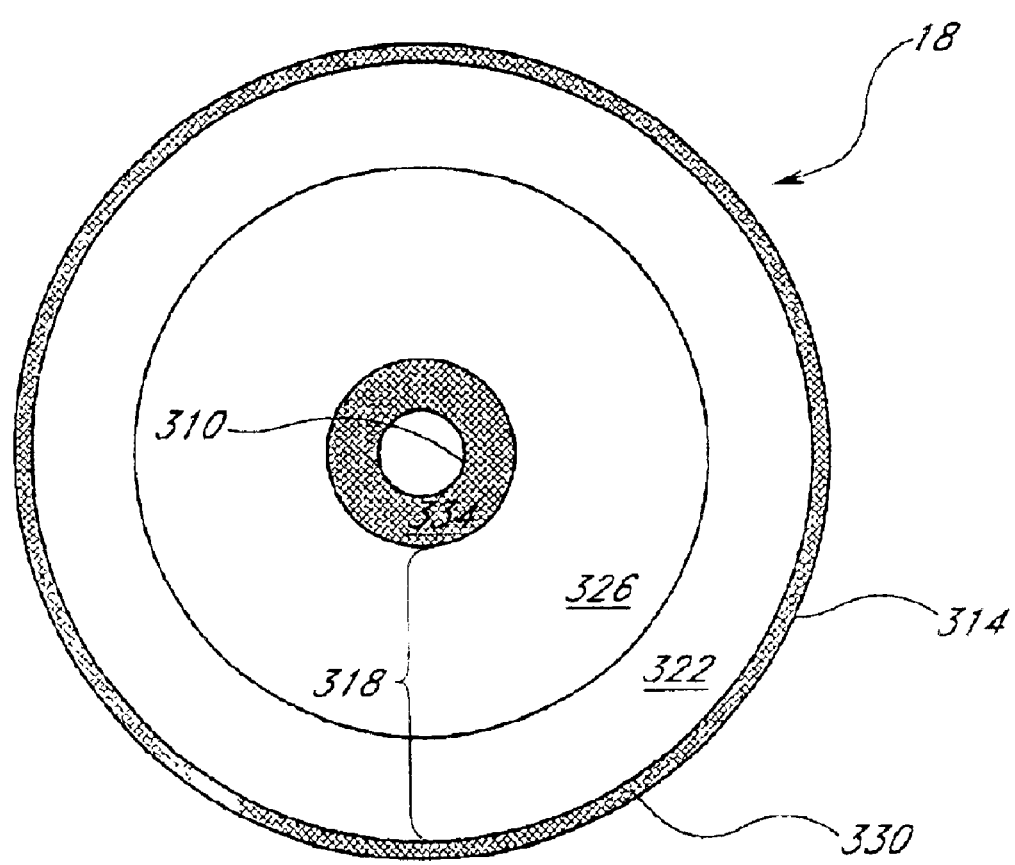
FIG. 3 pictorially represents a first radial band and a second radial band of the disk.

FIG. 3 shows one of the disks 18 that comprises an inner circumference 310, an outer circumference 314, and a magnetic-storage portion 318 between the inner circumference 310 and the outer circumference 314. The magnetic-storage portion 318 comprises a first radial band 322 proximate the outer circumference 314, and a second radial band 326 between the first radial band 322 and the inner circumference 310. As used herein, the term "proximate" means close to, and does not require the constituents that are "proximate" to be adjacent. Although FIG. 3 shows that the magnetic-storage portion 318 comprises two radial bands, more than two radial bands can be employed, each having an associated servo-writing spin rate. For example, three or more bands could be employed, each having an associated servo-writing spin rate. The disks 18 also have a portion 330 proximate the outer circumference 314 that is not used for recording. This portion has a radial width of about 2–3 mm. The disks 18 also comprise a portion 334 proximate the inner circumference 310 that is not used for recording, but which may be used as a landing zone.

As discussed above, the servo track writer 200 writes servo tracks onto the disks 18. These servo tracks are synchronized by the clock head 204, the timing circuit 216 and the controller 220. Although all of the servo tracks can be written onto the magnetic storage portion of the disks 18 while the disks 18 are rotating at a substantially constant spin rate, the applicants have determined that the disk runout performance desired cannot be achieved using this conventional servo writing procedures, while providing acceptable through-put.

Figure 4:
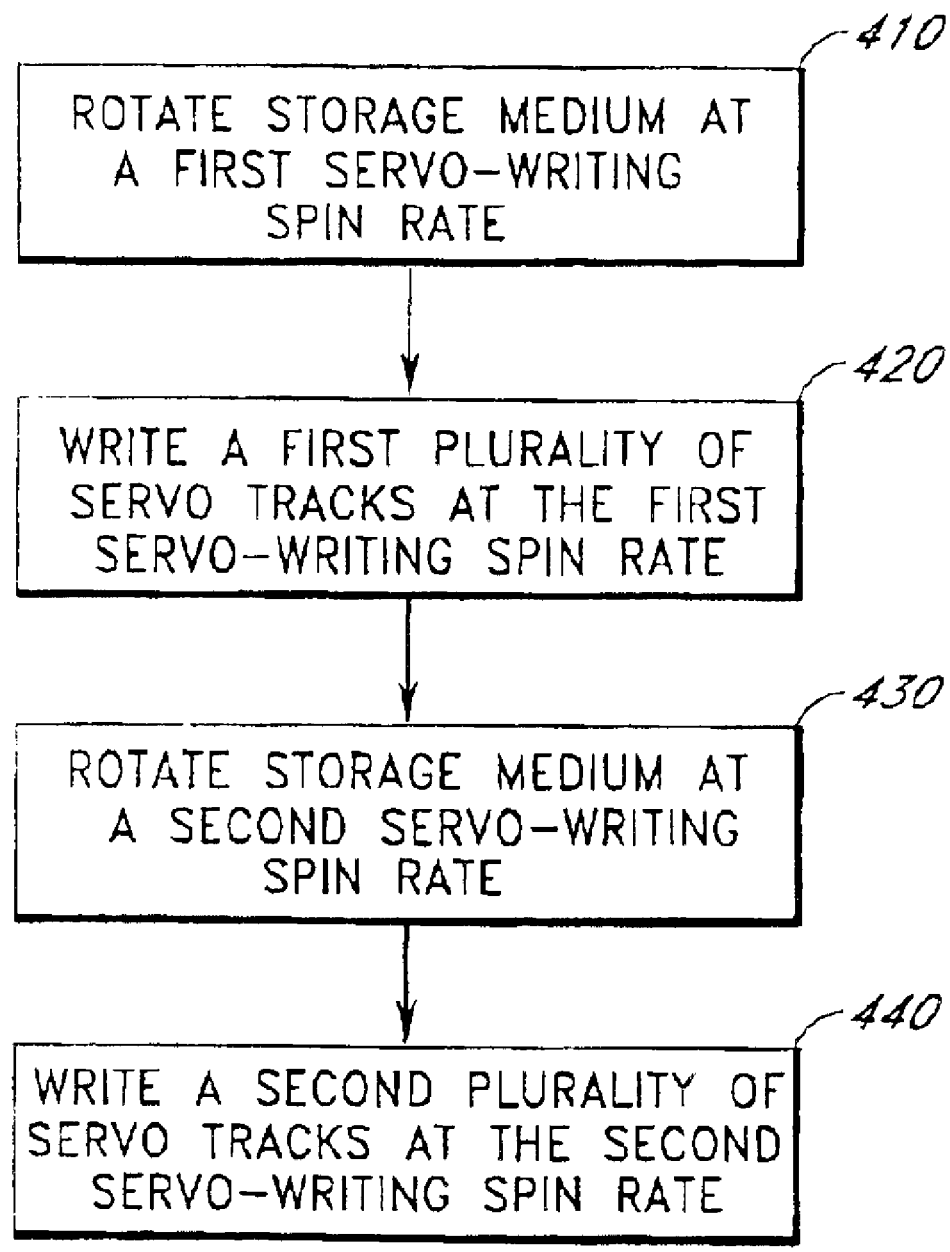
FIG. 4 shows a flow chart of a method for controlling written-in runout.

One exemplary embodiment 400 of the methods by which the servo tracks can be written to control written-in runout is shown in FIG. 4. In a step 410, the disk, or storage medium 18 is rotated at a first servo-writing spin rate. For example, in an exemplary disk drive having an operating spin rate of 7200 revolutions-per-minute (RPM), the first servo-writing spin rate is advantageously in a range between about 5000 RPM and 6500 RPM (e.g., about 5200 RPM or about 5600 RPM). Then, in a step 420, a first plurality of servo tracks are written to the storage medium 18 in the first radial band 322 at the first servo-writing spin rate. In a step 430, the storage medium 18 is rotated at a second servo-writing spin rate. For example the second servo-writing spin rate is advantageously in a range between about 7000 RPM and 9000 RPM (e.g., about 7800 RPM). Then, in a step 440, a second plurality of servo tracks are written to the storage medium 18 in the second radial band 326 at the second servo-writing spin rate.

Reduced written-in runout can be achieved in the disk drive 10 that comprises the rotary actuator 22, the recording head 26 mounted on the rotary actuator, and the storage medium 18 as described above. The disk drive 10 can further comprise the spindle motor 30 that rotates the storage medium 18 at a first servo-writing spin rate while the recording head 26 writes the first plurality of generally concentric servo tracks. The spindle motor 30 rotates the storage medium 18 at a second servo-writing spin rate while the recording head 26 writes the second plurality of servo tracks. The second servo-writing spin rate is different from the first servo-writing spin rate.

A servo track writer 200 can also control written-in runout of the servo tracks on the storage medium 18 of the head-disk assembly 14 of the disk drive 10 described above. As discussed above, the servo track writer 200 comprises a push pin 224 and a head positioner circuit 228, which comprises a positioning mechanism. The positioning mechanism can actuate the push pin 224 in a step-wise fashion to impart a step-wise movement to the actuator 22. The servo track writer 200 also comprises a controller 220 that directs the recording head 22 to write the servo tracks to the storage medium 18.

The controller 220 also applies a first current (or a first series of currents) to the spindle motor 30 over the line 236 to rotate the spindle motor 30 at a first servo-writing spin rate when the recording head is over the first radial band 322. The controller 220 also applies a second current (or a second series of currents) to the spindle motor 30 over the line 236 to rotate the spindle motor 30 at a second servo-writing spin rate when the recording head 26 is over the second radial band 326.

Another variation comprises a combination of the servo track writer 200 and the disk drive 10 described above.

Figure 5:
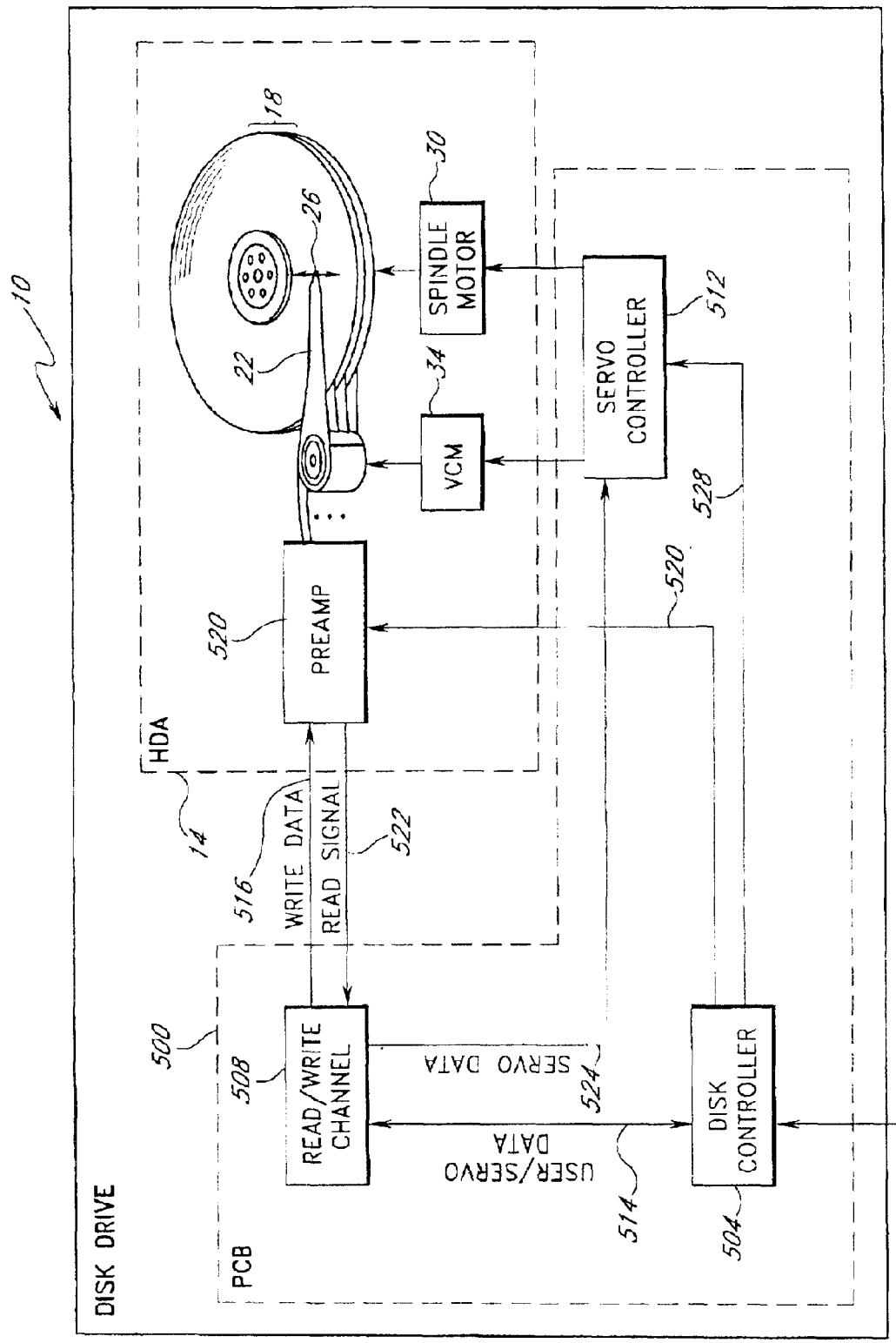
FIG. 5 shows a disk drive employing a "self-servowriting" operation internal to the disk drive to write the servo sectors to all of the recording surfaces during manufacturing to control the amount of runout written into the servo tracks.

As discussed above, an alternative method for writing the servo sectors to the recording surfaces of the disks 18 during manufacturing "self-servowriting." FIG. 5 shows one embodiment of the disk drive 10 that is capable of self-servowriting the servo tracks. Self-servowriting uses components on a printed circuit board 500 of the disk drive 10. The printed circuit board 500 can comprise a disk controller 504, a read/write channel 508, and a servo controller 512. FIG. 5 shows one manner of inter-connecting these components wherein a data line 514 propagates signals between the disk controller 504 and the read/write channel 508. Another data line 516 propagates signals from the read/write channel 508 to a preamplifier 520 on the HDA 14. A data line 522 propagates signals from the preamplifier 520 to the read/write channel 508. A data line 524 propagates servo data from the read/write channel 508 to the servo controller 512. A data line 528 propagates signals from the disk controller 504 to the servo controller 512. As is known, these components can be interconnected in different ways in the disk drive 10.

The self-servowriting technique can entail an iterative process wherein each servo track is written using information from a previously written servo track. The read/write channel 508 provides servo data to the servo controller 512 over the line 524. This servo data provides the radial position of the heads 26 with respect to the disks 18, as is known. The servo controller 512 is connected to the spindle motor 30 to cause the spindle motor 30 to rotate the disks 18 at at least two spin rates during the self-servowriting process. Alternately, the disk controller 504 is provided with the servo data and causes the servo controller 512 to spin the spindle motor 30 at at least two spin rates. The servo controller 512 also controls the VCM 34, as is known.

What is claimed is:

1. A method for controlling written-in runout of a disk drive comprising a recording head, a rotary actuator, a spindle motor, and a storage medium coupled to the spindle motor, the storage medium comprising an inner circumference, an outer circumference, and a magnetic-storage portion between the inner circumference and the outer circumference, the magnetic-storage portion comprising a first radial band proximate the outer circumference, and a second radial band between the first radial band and the inner circumference, the method comprising:

writing a first plurality of servo tracks to the storage medium in the first radial band at a first servo-writing spin rate; and writing a second plurality of servo tracks to the storage medium in the second radial band at a second servo-writing spin rate.

2. The method of claim 1, wherein the first servo-writing spin rate is less than the second servo-writing spin rate.

3. The method of claim 1, wherein the method is performed by a servo-writer.

4. The method of claim 1, wherein method is performed by self-servo-writing.

5. A disk drive comprising:
a rotary actuator;
a recording head mounted on the rotary actuator;
a storage medium comprising:
  an inner circumference;
  an outer circumference; and
  a magnetic-storage portion between the inner circumference and the outer circumference, the magnetic-storage portion comprising:
    a first radial band proximate the outer circumference comprising a first plurality of generally concentric servo tracks; and
    a second radial band between the first radial band and the inner circumference, the second radial band comprising a second plurality of generally concentric servo tracks; and
a spindle motor that rotates the storage medium at a first servo-writing spin rate while the recording head writes the first plurality of generally concentric servo tracks, and that rotates the storage medium at a second servo-writing spin rate while the recording head writes the second plurality of servo tracks, the second servo-writing spin rate being different from the first servo-writing spin rate.

6. The disk drive of claim 5, wherein the first servo-writing spin rate is less than the second servo-writing spin rate.

7. The disk drive of claim 5, wherein the first plurality of servo tracks and the second plurality of servo tracks are written by a servo-track writer.

8. The disk drive of claim 5, wherein the first plurality of servo tracks and the second plurality of servo tracks are written by the disk drive.

9. A disk drive comprising:
a rotary actuator;
a recording head mounted on the rotary actuator;
a spindle motor; and
a storage medium mounted on the spindle motor, the storage medium comprising:
  an inner circumference;
  an outer circumference; and
  a magnetic-storage portion between the inner circumference and the outer circumference, the magnetic-storage portion comprising a first radial band proximate the outer circumference comprising a first plurality of generally concentric servo tracks, and a second radial band between the first radial band and the inner circumference, the second radial band comprising a second plurality of generally concentric servo tracks, wherein the magnetic storage portion is written by:
    writing a first plurality of servo tracks to the storage medium in the first radial band at a first servo-writing spin rate; and
    writing a second plurality of servo tracks to the storage medium in the second radial band at a second servo-writing spin rate.

10. The disk drive of claim 9, wherein the first servo-writing spin rate is less than the second servo-writing spin rate.

11. A servo track writer for writing servo tracks on a storage medium of a head-disk assembly that comprises a recording head mounted on an actuator, a spindle motor, the storage medium mounted on the spindle motor, the storage medium comprising an inner circumference, an outer circumference, and a magnetic-storage portion between the inner circumference and the outer circumference, the magnetic-storage portion comprising a first radial band proximate the outer circumference, and a second radial band between the first radial band and the inner circumference, the servo track writer comprising;
a push pin;
a head positioner circuit that comprises a positioning mechanism that actuates the push pin in a step-wise fashion to impart a step-wise movement to the actuator; and
a controller that directs the recording head to write the servo tracks to the storage medium, that applies a first current to the spindle motor to rotate the spindle motor at a first servo-writing spin rate when the recording head is over the first radial band, and that applies a second current to the spindle motor to rotate the spindle motor at a second servo-writing spin rate when the recording head is over the second radial band.

12. The servo track writer of claim 11, wherein the first servo-writing spin rate is less than the second servo-writing spin rate.

13. A servo track writer and disk drive combination comprising:
a disk drive comprising:
  a recording head;
  a rotary actuator;
  a spindle motor; and
  a storage medium coupled to the spindle motor, the storage medium comprising an inner circumference, an outer circumference, and a magnetic-storage portion between the inner circumference and the outer circumference, the magnetic-storage portion comprising a first radial band proximate the outer circumference, and a second radial band between the first radial band and the inner circumference; and
a servo track writer comprising:
  a push pin that engages the rotary actuator in the disk drive;
  a head positioner circuit comprising a positioning mechanism that actuates the push pin in a step-wise fashion to impart a step-wise movement to the actuator; and
  a controller that directs the head to write the servo tracks, that applies a first current to the spindle motor to rotate the spindle motor at a first servo-writing spin rate when the recording head is over the first radial band, and that applies a second current to the spindle motor to rotate the spindle motor at a second servo-writing spin rate when the recording head is over the second radial band.

14. The servo track writer and disk drive combination of claim 13, wherein the first servo-writing spin rate is less than the second servo-writing spin rate.

* * * * *